(12) United States Patent
Edwards et al.

(10) Patent No.: US 10,496,998 B1
(45) Date of Patent: Dec. 3, 2019

(54) GENERATING A RANDOM VERIFICATION CODE FOR A TRANSACTION

(71) Applicant: Capital One Services, LLC, McLean, VA (US)

(72) Inventors: Joshua Edwards, Philadelphia, PA (US); Abdelkadar M'Hamed Benkreira, Washington, DC (US); Michael Mossoba, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 15/980,175

(22) Filed: May 15, 2018

(51) Int. Cl.
  *G06Q 40/00* (2012.01)
  *G06Q 20/40* (2012.01)
  *G06F 7/58* (2006.01)
  *G06Q 20/38* (2012.01)

(52) U.S. Cl.
  CPC ......... *G06Q 20/4018* (2013.01); *G06F 7/582* (2013.01); *G06Q 20/382* (2013.01)

(58) Field of Classification Search
  USPC ........... 705/44, 39, 38, 37; 700/83; 709/203; 235/379
  See application file for complete search history.

(56) References Cited

U.S. PATENT DOCUMENTS

| | | | | |
|---|---|---|---|---|
| 7,988,045 B2* | 8/2011 | Connell, II | .......... | G06Q 20/208 235/383 |
| 8,355,987 B2* | 1/2013 | Hirson | .......... | G06Q 20/023 705/40 |
| 8,538,863 B1* | 9/2013 | Saunders | .......... | H04L 9/3271 705/38 |
| 8,676,709 B2* | 3/2014 | Kunz | .......... | G06Q 20/105 705/44 |
| 8,806,603 B2* | 8/2014 | Svigals | .......... | G06F 21/44 705/35 |
| 9,424,570 B2* | 8/2016 | Fefferman | .......... | G06Q 20/3274 |

(Continued)

OTHER PUBLICATIONS

Merhi, M., Hernandez-Castro, J.C., Peris-Lopez, P., Studying the pseudo random number generator of a low-cost RFID tag, 2011 IEEE International Conference on RFID—Technologies and Applications (pp. 381-385). (Year: 2011).*

(Continued)

*Primary Examiner* — Tien C Nguyen
(74) *Attorney, Agent, or Firm* — Harrity & Harrity, LLP

(57) ABSTRACT

A device receives, from a user device, a request to generate a verification code for a transaction associated with a user of the user device, and receives user profile information associated with a transaction card to be used for the transaction. The device generates a random verification code for the transaction based on the request and the user profile information, and authenticates the random verification code, based on the user profile information, to generate an authenticated random verification code. The device provides the authenticated random verification code to the user device, and receives transaction information, including the authenticated random verification code, from a merchant device associated with the transaction. The device validates the transaction based on the transaction information, and provides, to the merchant device associated with the transaction, information indicating that the transaction is validated.

20 Claims, 12 Drawing Sheets

(56) References Cited

U.S. PATENT DOCUMENTS

| | | | |
|---|---|---|---|
| 10,346,828 B2* | 7/2019 | Barrese | G06Q 20/3227 |
| 2007/0219928 A1 | 9/2007 | Madhogarhia | |
| 2008/0029593 A1 | 2/2008 | Hammad et al. | |
| 2009/0187507 A1 | 6/2009 | Brown | |
| 2009/0173782 A1 | 7/2009 | Muscato | |
| 2010/0179907 A1* | 7/2010 | Atkinson | G06Q 20/10 |
| | | | 705/44 |
| 2010/0299220 A1* | 11/2010 | Baskerville | G06Q 20/32 |
| | | | 705/26.35 |
| 2012/0150742 A1 | 6/2012 | Poon et al. | |
| 2012/0290482 A1* | 11/2012 | Atef | G06F 21/31 |
| | | | 705/44 |
| 2014/0249968 A1* | 9/2014 | MacKinnon Keith | G06K 5/00 |
| | | | 705/26.82 |
| 2015/0206147 A1 | 7/2015 | Stanfield et al. | |
| 2017/0140379 A1 | 5/2017 | Deck | |

OTHER PUBLICATIONS

P. Gaborit, M. Girault, Lightweight code-based identification and signature, 2007 IEEE International Symposium on Information Theory (pp. 191-195). (Year: 2007).*
Extended European Search Report for Application No. EP19173204. 9, dated Jul. 23, 2019, 9 pages.

* cited by examiner

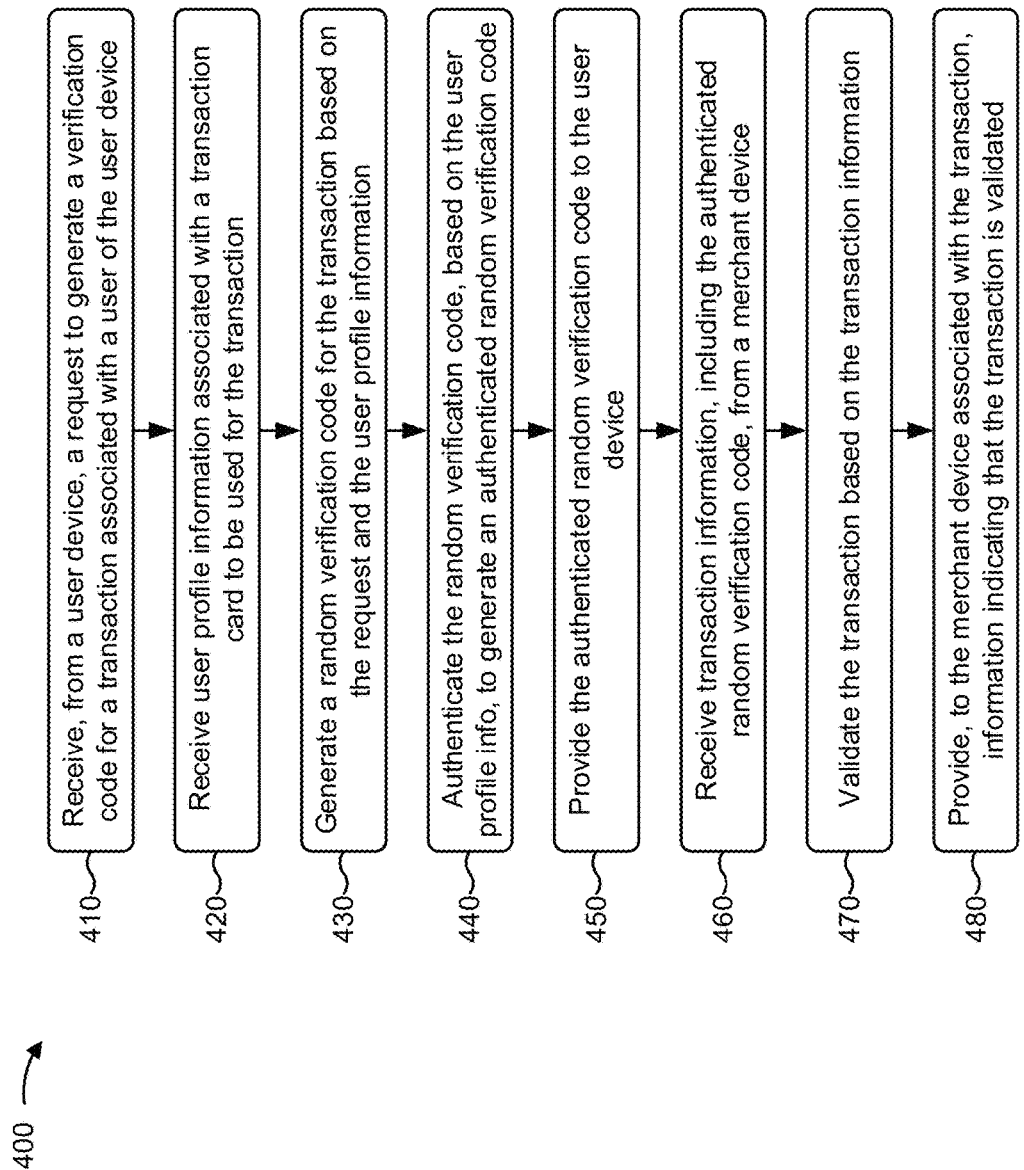

US 10,496,998 B1

GENERATING A RANDOM VERIFICATION CODE FOR A TRANSACTION

BACKGROUND

A user utilizing a transaction card (e.g., a credit card, a debit card, and/or the like) to make an online purchase is required to provide transaction card information, such as a transaction card number, a cardholder name on the transaction card, mailing address information of the cardholder, and a card verification value (CVV), which may be accessed from a front side or a back side of the transaction card. If this transaction card information is misappropriated by a person other than the cardholder, the person may utilize the transaction card to make illicit purchases until the cardholder discovers that the transaction card information was misappropriated and reports the misappropriation.

SUMMARY

According to some implementations, a device may include one or more memories, and one or more processors configured to receive, from a user device, a request to generate a verification code for a transaction associated with a user of the user device, and receive user profile information associated with a transaction card to be used for the transaction. The one or more processors may generate a random verification code for the transaction based on the request and the user profile information, and may authenticate the random verification code, based on the user profile information, to generate an authenticated random verification code. The one or more processors may provide the authenticated random verification code to the user device, and may receive transaction information, including the authenticated random verification code, from a merchant device associated with the transaction. The one or more processors may validate the transaction based on the transaction information, and may provide, to the merchant device associated with the transaction, information indicating that the transaction is validated.

According to some implementations, a non-transitory computer-readable medium may store instructions that include one or more instructions that, when executed by one or more processors of a device, cause the one or more processors to receive user profile information associated with generating a verification code for a transaction card to be used for a transaction. The transaction and the transaction card may be associated with a user of a user device, and the user profile information may include one or more of information identifying the transaction card, information identifying an account associated with the transaction card, information indicating that the verification code is to be used for the transaction, information indicating that the verification code is to be used for a particular time period, or information indicating the particular time period. The one or more instructions may cause the one or more processors to receive, from the user device, a request to generate the verification code for the transaction, and generate a random verification code for the transaction based on the request and the user profile information. The one or more instructions may cause the one or more processors to authenticate the random verification code, based on the user profile information, to generate an authenticated random verification code, and provide the authenticated random verification code to the user device. The one or more instructions may cause the one or more processors to receive transaction information, including the authenticated random verification code, from a merchant device associated with the transaction, and validate the transaction based on the transaction information. The one or more instructions may cause the one or more processors to provide, to the merchant device associated with the transaction, information indicating that the transaction is validated, and provide, to the user device, information confirming that the transaction is complete.

According to some implementations, a method may include receiving, by a device and from a user device, a request to generate a verification code for a transaction associated with a user of the user device, wherein a transaction card, associated with the user, may be used for the transaction and may not include the verification code. The method may include generating, by the device, the verification code for the transaction based on the request and based on user profile information, wherein the user profile information may be associated with the transaction card, and wherein the user profile information may include information indicating that the verification code is valid for the transaction for a particular time period. The method may include authenticating, by the device and based on the user profile information, the verification code to generate an authenticated verification code, and providing, by the device, the authenticated verification code to the user device. The method may include receiving, by the device and from a merchant device associated with the transaction, transaction information that includes the authenticated verification code, and determining, by the device and based on the transaction information, that the verification code is being utilized for the transaction within the particular time period. The method may include validating, by the device, the transaction based on determining that the verification code is being utilized for the transaction within the particular time period, and providing, by the device and to the merchant device associated with the transaction, information indicating that the transaction is validated.

BRIEF DESCRIPTION OF THE DRAWINGS

FIG. 4 is a flow chart of an example process for generating a random verification code for a transaction.

DETAILED DESCRIPTION

The following detailed description of example implementations refers to the accompanying drawings. The same reference numbers in different drawings may identify the same or similar elements.

By the time the cardholder discovers that transaction card information has been misappropriated, the person who misappropriated the transaction card information may have illegally used the transaction card to obtain goods, services, and/or money. When the cardholder discovers the misappropriation, the cardholder is required to contact an issuing financial institution and report the misappropriation. The cardholder must physically contact the issuing financial institution via telephone, which may be burdensome and time consuming.

Some implementations described herein provide a transaction platform that generates a random verification code for a transaction. For example, the transaction platform may receive, from a user device, a request to generate a verification code for a transaction associated with a user of the user device, and may receive user profile information associated with a transaction card to be used for the transaction. The transaction platform may generate a random verification code for the transaction based on the request and the user profile information, and may authenticate the random verification code, based on the user profile information, to generate an authenticated random verification code. The transaction platform may provide the authenticated random verification code to the user device, and may receive transaction information, including the authenticated random verification code, from a merchant device associated with the transaction. The transaction platform may validate the transaction based on the transaction information, and may provide, to the merchant device, information indicating that the transaction is validated.

Figure 1A:
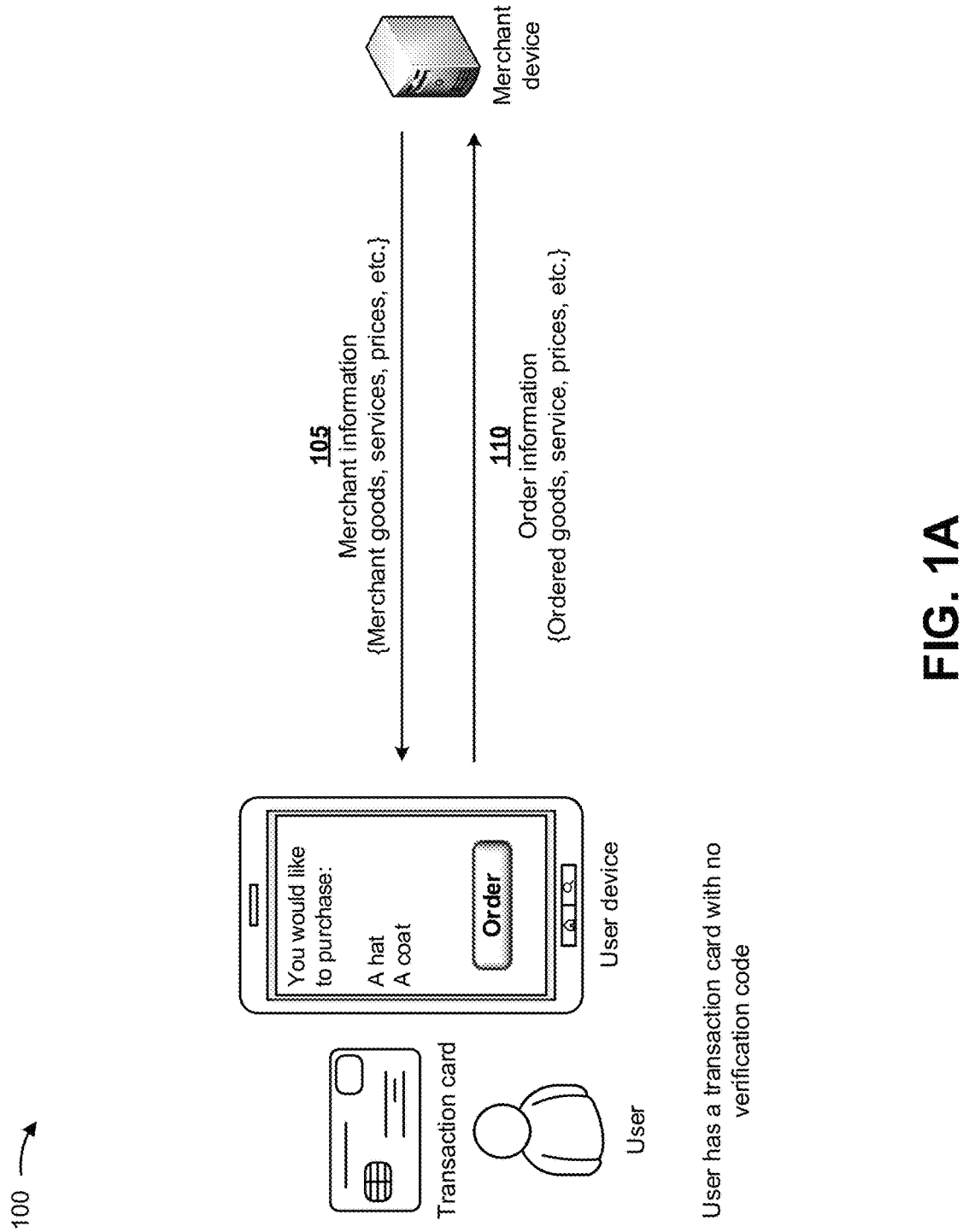
FIGS. 1A-1I are diagrams of an overview of an example implementation described herein.

FIGS. 1A-1I are diagrams of an overview of an example implementation 100 described herein. As shown in FIG. 1A, a user device (e.g., a mobile device) may be associated with a user, a transaction card, and a merchant device. As further shown, the transaction card may not include a verification code (e.g., a card security code (CSC), a card verification data (CVD), a card verification number, a card verification value (CVV), a card verification value code, a card verification code (CVC), a verification code (V-code), a signature panel code (SPC), and/or the like). In some implementations, the transaction card may include a credit card, a debit card, a gift card, an automated teller machine (ATM) card, a rewards card, a client loyalty card, and/or the like. Assume that the user wishes to purchase goods and/or services from a merchant associated with the merchant device, and causes the user device to access a website provided by the merchant device. Further assume that the user wishes to utilize the transaction card to pay for the goods and/or services.

As further shown in FIG. 1A, and by reference number 105, after communications are established between the user device and the merchant device (e.g., when the user device accesses the merchant web site), the merchant device may provide merchant information to the user device, and the user device may receive the merchant information. In some implementations, the merchant information may include information identifying goods sold by the merchant, services offered by the merchant, prices associated with the goods, prices associated with the services, promotions offered by the merchant, and/or the like. For example, if the merchant is a clothes retailer, the merchant information may include information identifying clothes (e.g., shirts, hats, coats, shoes, etc.) offered by the merchant, services (e.g., alterations, tailoring, etc.) offered by the merchant, prices associated with the clothes and the services, and/or the like.

As further shown in FIG. 1A, the user device may provide the merchant information for display via a user interface, and the user may select goods and/or services from the merchant information, via the user interface. For example, the user may select a hat and a coat from the merchant information when the merchant is a clothes retailer. As further shown in FIG. 1A, and by reference number 110, after the user selects the goods and/or services from the merchant information, the user may cause the user device to provide order information to the merchant device. The merchant device may receive the order information from the user device. In some implementations, the order information may include information identifying one or more goods selected by the user, one or more services selected by the user, prices associated with the selected goods and/or services, and/or the like.

Figure 1B:
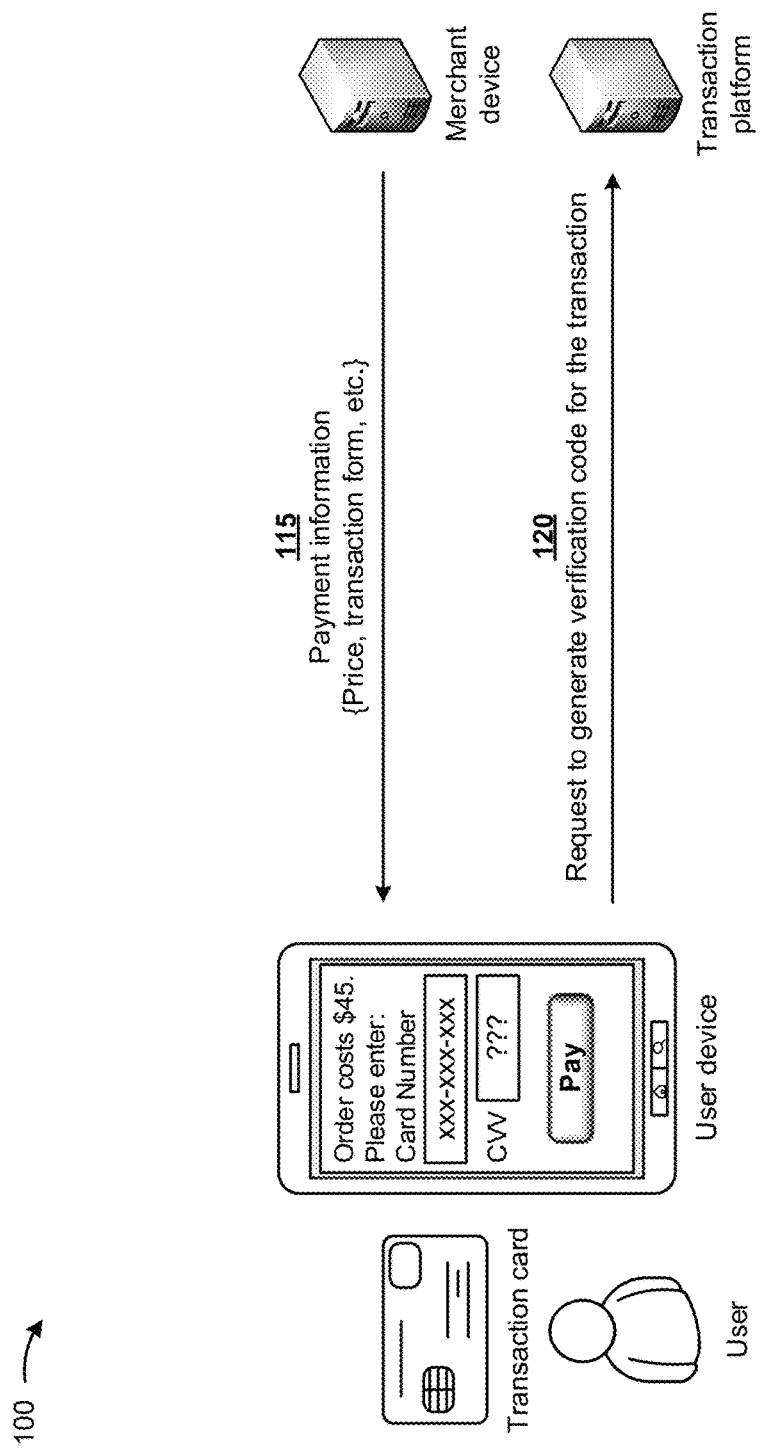

As shown in FIG. 1B, and by reference number 115, the user device may receive, from the merchant device, payment information associated with the one or more goods and/or services ordered by the user. In some implementations, the merchant device may provide the payment information to the user device based on receiving the order information from the user device. In some implementations, the payment information may include information identifying the merchant device, the merchant, the user device, the user, a price for the order, a transaction form for completing a transaction for the order (e.g., for providing payment information, such as a transaction card number), and/or the like. In some implementations, the transaction form may include information requesting a card number and a verification code (e.g., a CVV) associated with the transaction card.

As further shown in FIG. 1B, the user device may provide the payment information for display to the user via a user interface. For example, the user interface may indicate that the order costs a price of $45.00 and may request the card number and the verification code associated with the transaction card. The user interface may include a mechanism (e.g., a "Pay" button, icon, hyperlink, and/or the like) that, when selected, causes the user device to begin the transaction process for the order. However, since the transaction card does not include a verification code, the user may not input the verification code via the user interface.

Instead, as further shown in FIG. 1B, and by reference number 120, the user device may automatically (or the user may cause the user device to) provide, to a transaction platform, a request to generate a verification code for the transaction. The transaction platform may receive the request to generate the verification code from the user device. In some implementations, the request to generate the verification code may include the card number of the transaction card, information identifying credentials of the user and/or the user device (e.g., a user name, a user device identifier, a password, and/or the like), information identifying the merchant, biometric information of the user (e.g., a facial image, a retinal scan, a fingerprint, a voice print, and/or the like, that may be used to verify a correct user and may be user-configurable to provide one or more of the biometrics, to provide none of the biometrics, and/or the like), and/or the like.

Figure 1C:
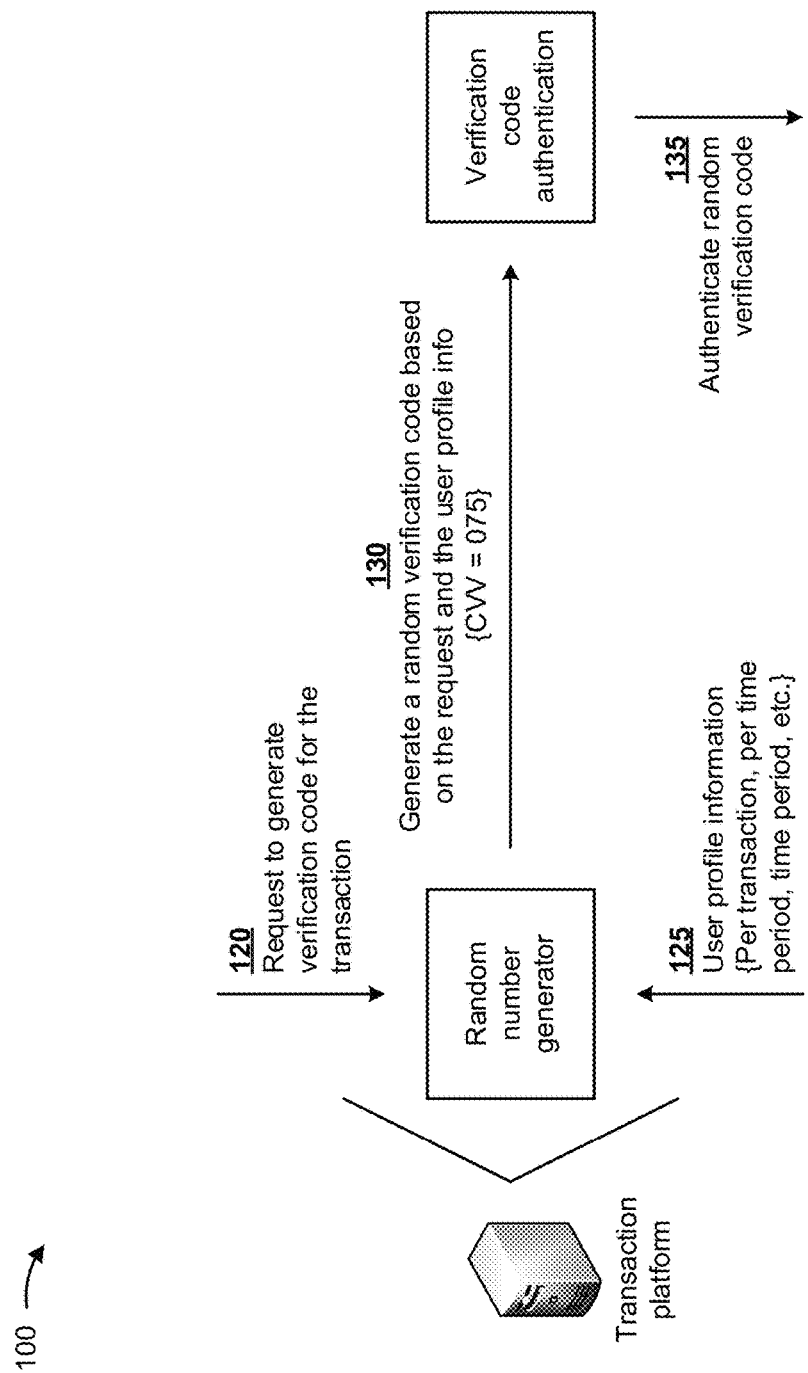

As shown in FIG. 1C, and by reference numbers 120 and 125, a random number generator, associated with the transaction platform, may receive the request to generate the verification code for the transaction and user profile information. In some implementations, the user profile information may include information indicating how the user wishes to generate the verification code. For example, the user profile information may include information indicating that the user wishes to generate a verification code that is valid for a single transaction, information indicating that the user wishes to generate a verification code that is valid for transactions at a particular merchant, information indicating that the user wishes to generate a verification code that is valid for a particular time period (e.g., in seconds, minutes, hours, etc.), information identifying the time period, and/or the like.

As further shown in FIG. 1C, and by reference number 130, the transaction platform may utilize the random number generator to generate a random verification code based on the request and the user profile information. For example, the transaction platform may generate a verification code (e.g., a CVV=075) that is valid for the transaction and based on the user profile information. In some implementations, the transaction platform may determine a type of verification code to generate based on the user profile information. For example, if the user profile information indicates that a transaction card associated with the user requires a three-digit CVV, the transaction platform may generate a three-digit CVV as the verification code. In another example, if the user profile information indicates that the user configured the transaction card to require a five-digit code, the transaction platform may generate a five-digit code as the verification code.

In some implementations, the random number generator may include one or more of a pseudorandom number generator, a hardware random number generator, a cryptographically-secure pseudorandom number generator, and/or a random number generator that uses external entropy. In some implementations, the verification code may include three digits, four digits, a user-configurable number of digits, alphanumeric characters, and/or the like.

The pseudorandom number generator may generate a sequence of numbers whose properties approximate properties of sequences of random numbers. A sequence generated by the pseudorandom number generator is not truly random, because it is completely determined by an initial value, called a seed (which may include truly random values) of the pseudorandom number generator. Although sequences that are closer to truly random may be generated using hardware random number generators, pseudorandom number generators may quickly generate numbers and are reproducible.

The hardware random number generator may generate random numbers from a physical process, rather than a computer program. The hardware random number generator may be based on microscopic phenomena that generate low-level, statistically random noise signals. The hardware random number generator may include a transducer to convert some aspect of a physical phenomenon to an electrical signal, an amplifier and other electronic circuitry to increase an amplitude of random fluctuations to a measurable level, and some type of analog to digital converter to convert output into a digital number, often a simple binary digit. The hardware random number generator may generate a series of random numbers by repeatedly sampling a randomly varying signal.

The cryptographically-secure pseudorandom number generator may include properties that make the generator suitable for use in cryptography. In some implementations, the cryptographically-secure pseudorandom number generator may utilize entropy obtained from a high-quality source to generate random numbers. For example, the cryptographically-secure pseudorandom number generator may use a randomness application program interface (API) of an operating system. From an information-theoretic point of view, an amount of randomness that can be generated by the cryptographically-secure pseudorandom number generator may be equal to an entropy provided by a system.

The random number generator that uses external entropy may gather data from one or more external entropy sources and may utilize the gathered data to generate random number data. For example, a random number generator that uses external entropy may include CryptGenRandom, which is a cryptographically secure pseudorandom number generator function. As another example, a random number generator that uses external entropy may include Fortuna, which is a cryptographically secure pseudorandom number generator system that includes a generator (e.g., that produces an indefinite quantity of pseudorandom data), an entropy accumulator (e.g., that collects genuinely random data from various sources and uses the data to reseed the generator when enough new randomness has arrived), and a seed file (e.g., that stores enough state to enable the system to start generating random numbers). As yet another example, a random number generator that uses external entropy may include the Yarrow generator, which is a cryptographic pseudorandom number generator system that includes an entropy accumulator, a reseed mechanism, a generation mechanism, and a reseed control.

In this way, the transaction platform may utilize one or more random number generators to generate the verification code. In some implementations, the transaction platform may select which one or more of the random number generators to utilize based on the request to generate the verification code, the user profile information, and/or the like. In some implementations, the transaction platform may utilize multiple random number generators, may weight results of the multiple random number generators, and may combine the results to obtain a final result (e.g., the verification code).

As further shown in FIG. 1C, and by reference number 135, the transaction platform may authenticate the random verification code to generate an authenticated verification code. In some implementations, the transaction platform may authenticate the random verification code based on the user profile information, such as whether the verification code satisfies user-configurable information (e.g., a user-configured type of verification code), information associated with the transaction card, such as a card number, a card type, a cardholder billing address, and/or the like, information associated with the determination of whether the transaction is fraudulent, and/or the like. If the transaction platform does not authenticate the verification code, the transaction platform may provide, to the user device, a message indicating that the transaction is not authorized and that the verification code could not be generated. In some implementations, the transaction platform may automatically generate an authenticated verification code and need not authenticate the random verification code.

Figure 1D:
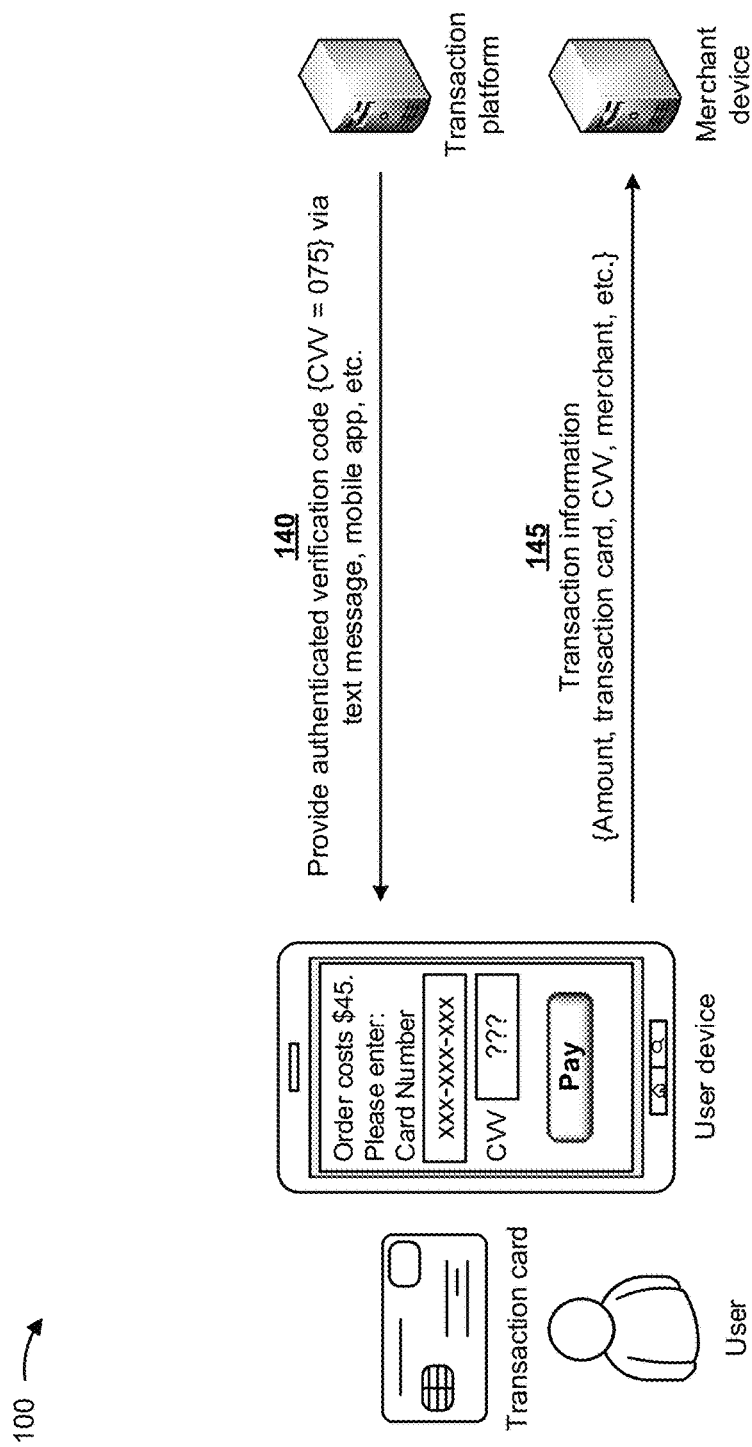

As shown in FIG. 1D, and by reference number 140, if the transaction platform authenticates the verification code, the transaction platform may provide the authenticated verification code to the user device via short message service (SMS) or text message application, a mobile application provided on the user device, and/or the like. In some implementations, the transaction platform may provide the authenticated verification code to the user device via other mechanisms, as described elsewhere herein. The user may utilize the user device to input the authenticated verification code in the transaction form, and may select the "Pay" mechanism associated with the transaction form. In some implementations, the user device may automatically populate the authenticated verification code in the transaction form, may open an application associated with the transaction card (e.g., a banking application) that displays the authenticated verification code, and/or the like.

As further shown in FIG. 1D, and by reference number 145, the user selection of the "Pay" mechanism may cause the user device to provide transaction information to the merchant device. The merchant device may receive the transaction information. In some implementations, the transaction information may include information identifying an amount of the transaction (e.g., the price of $45.00), the transaction card number, the authenticated verification code, a merchant account associated with the merchant and to which payment is to be provided, a name of the merchant, the goods and/or services associated with the order, and/or the like.

In some implementations, the user device and the merchant device may utilize one or more encryption techniques to encrypt and provide secure communications between the user device and the merchant device. In some implementations, the one or more encryption techniques may include a Rivest-Shamir-Adleman (RSA) encryption technique, a Diffie-Hellman encryption technique, a digital signature algorithm (DSA) encryption technique, an ElGamal encryption technique, an elliptic-curve cryptography (ECC) encryption technique, an elliptic curve digital signature algorithm (ECDSA) encryption technique, an efficient and compact subgroup trace representation (XTR) encryption technique, and/or the like.

The RSA encryption technique may include a type of public-key cryptosystem. A public-key cryptosystem employs a public encryption key (e.g., an encryption key that can be used by anyone) to encrypt the data, and employs a private decryption key (e.g., a decryption key that is kept secret) such that only someone who has the private key can decrypt the data. In some implementations, a user of the RSA encryption technique may create and then publish a public key based on two large prime numbers, along with an auxiliary value. The prime numbers are kept secret. Anyone can use the public key to encrypt a message, but (with currently published methods) if the public key is large enough, only someone with knowledge of the prime numbers can decode the message.

The Diffie-Hellman encryption technique may include a method of securely exchanging cryptographic keys in which two parties that have no prior knowledge of each other can jointly establish a shared secret key over an insecure channel, and the key can then be used to encrypt subsequent communications using a symmetric key cipher. For example, in a Diffie-Hellman key encryption technique, each party may generate a public/private key pair and distribute the public key. After obtaining an authentic copy of each of the public keys, the parties can compute a shared secret offline. The shared secret can be used, for instance, as the key for a symmetric cipher.

The DSA encryption technique may utilize the Federal Information Processing Standard (FIPS) for digital signatures. The DSA encryption technique may be used by a signatory to generate a digital signature on data and by a verifier to verify an authenticity of the signature. In this case, each signatory may have a public key and a private key. The private key is used in the signature generation process and the public key is used in the signature verification process. For both signature generation and signature verification, the data (i.e., a message) is reduced by means of a secure hash algorithm (e.g., the Secure Hash Algorithm (SHA) specified in FIPS 180-1). An adversary, who does not know the private key of the signatory, cannot generate the correct signature of the signatory. However, by using the signatory's public key, anyone can verify a correctly signed message.

The ElGamal encryption technique may include an asymmetric key encryption technique for public-key cryptography that is based on the Diffie-Hellman encryption technique. The ElGamal encryption technique may provide an additional layer of security by asymmetrically encrypting keys previously used for symmetric message encryption.

The ECC encryption technique may include a form of public-key cryptography based on an algebraic structure of elliptic curves over finite fields. For elliptic curve-based protocols, finding a discrete logarithm of a random elliptic curve element with respect to a publicly known base point is assumed to be infeasible. This is known as the elliptic curve discrete logarithm problem (ECDLP). The security of elliptic curve cryptography depends on the ability to compute a point multiplication and the inability to compute a multiplicand given an original and product points. The ECC encryption technique may require smaller keys compared to non-ECC cryptography to provide equivalent security.

The ECDSA encryption technique may include a technique that is a variant of the DSA encryption technique and that employs the ECC encryption technique. The ECDSA encryption technique utilizes a discrete logarithm problem of classical computers for computation hardness.

The XTR encryption technique may include a technique that makes use of traces to represent and calculate powers of elements of a subgroup of a finite field. For example, the XTR encryption technique may include an algorithm for public-key encryption that represents elements of a subgroup of a multiplicative group of a finite field. Unlike many cryptographic protocols that are based on a generator of a full multiplicative group of a finite field, the XTR encryption technique uses a generator of a relatively small subgroup of some prime order of a subgroup. From a security point of view, the XTR encryption technique relies on the difficulty of solving discrete logarithm related problems in a multiplicative group of a finite field.

In this way, the user device and merchant device may utilize one or more of the aforementioned encryption techniques to provide secure communications between the user device and the merchant device. In some implementations, the user device and/or the merchant device may select which one or more of the encryption techniques to utilize based on an amount of the transaction, preferences provided by the user of the user device, preferences provided by the merchant, and/or the like.

In some implementations, the transaction platform may establish secure communications with the merchant device. In such implementations, the transaction platform and/or the merchant device may utilize the one or more encryption techniques, described elsewhere herein, to encrypt and provide secure communications between the transaction platform and merchant device.

Figure 1E:
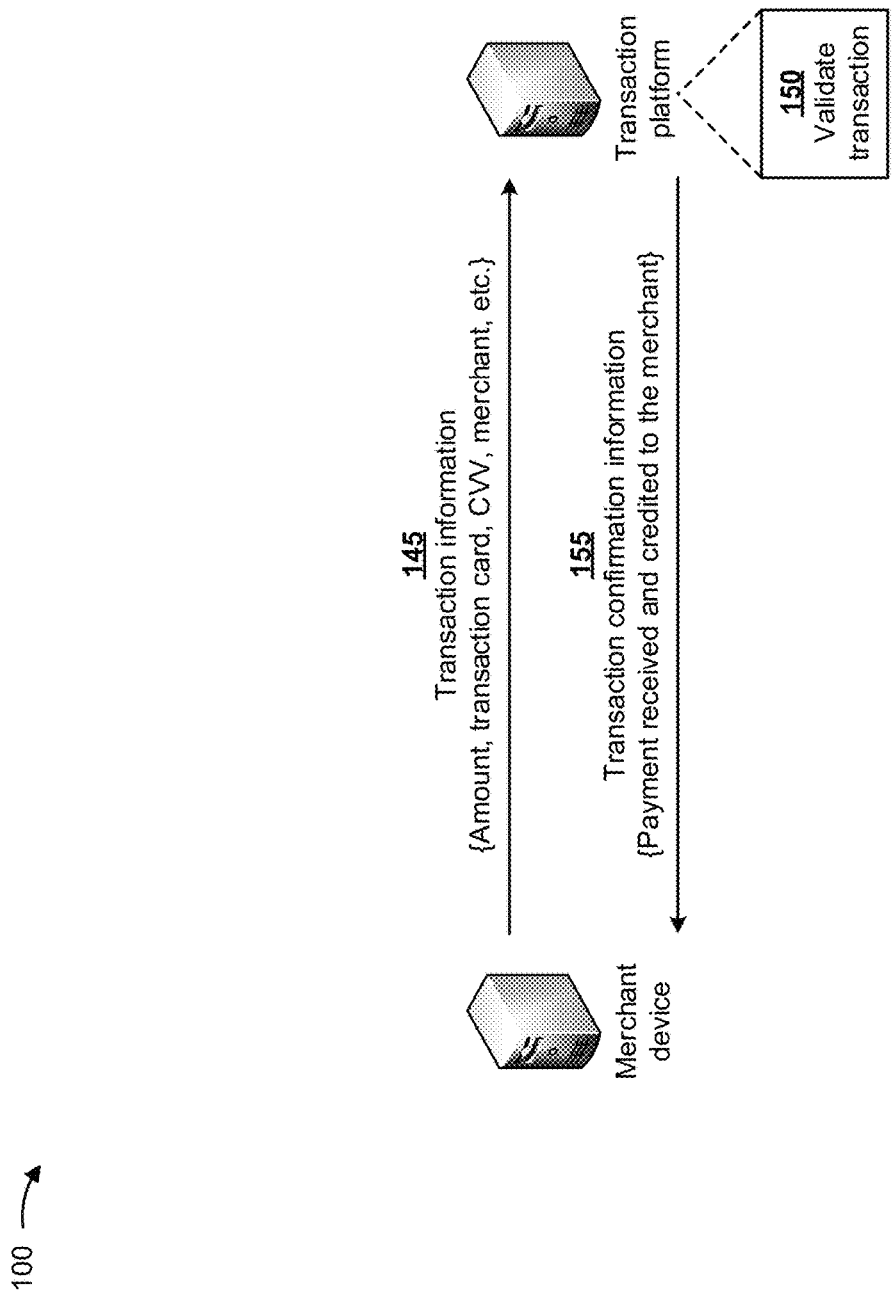

As further shown in FIG. 1E, and by reference number 145, after the secure communications are established between the transaction platform and the merchant device, the merchant device may securely provide, to the transaction platform, the transaction information to utilize for the transaction. In some implementations, and as shown by reference number 150 in FIG. 1E, the transaction platform may receive the transaction information, and may validate the transaction based on the transaction information. For example, the transaction platform may validate that the user is associated with the transaction card and authenticated verification code, may validate that the transaction card contains enough funds to pay for the transaction, may validate that the merchant account is legitimate, and/or the like. If the transaction platform does not validate the transaction, the transaction platform may deny the transaction and provide, to the user device, information indicating that the transaction is invalid and denied. If the transaction platform validates the transaction, the transaction platform may approve the transaction, may provide, to the user device, information indicating that the transaction is valid and approved, and may credit the merchant account with the amount paid for the order.

In some implementations, the authenticated verification code may be associated with the user and accessible to the transaction platform by associating the authenticated verification code with a record associated with an account of the user once the verification code is generated and/or authenticated. In such implementations, the record may be similar to records utilized by existing systems to associate a CVV with a transaction card or an account, such that the transaction platform may dynamically configure or update the record. The authenticated verification code may then be validated in a manner similar to a manner in which a CVV is validated, but based on the dynamically configured or updated record.

As further shown in FIG. 1E, and by reference number 155, when the transaction platform validates the transaction, the transaction platform may securely provide, to the merchant device, transaction confirmation information. In some implementations, the transaction confirmation information may include information confirming the transaction, information indicating that payment was received for the transaction from the transaction card, information indicating that the payment was credited to the merchant account, and/or the like.

Figure 1F:
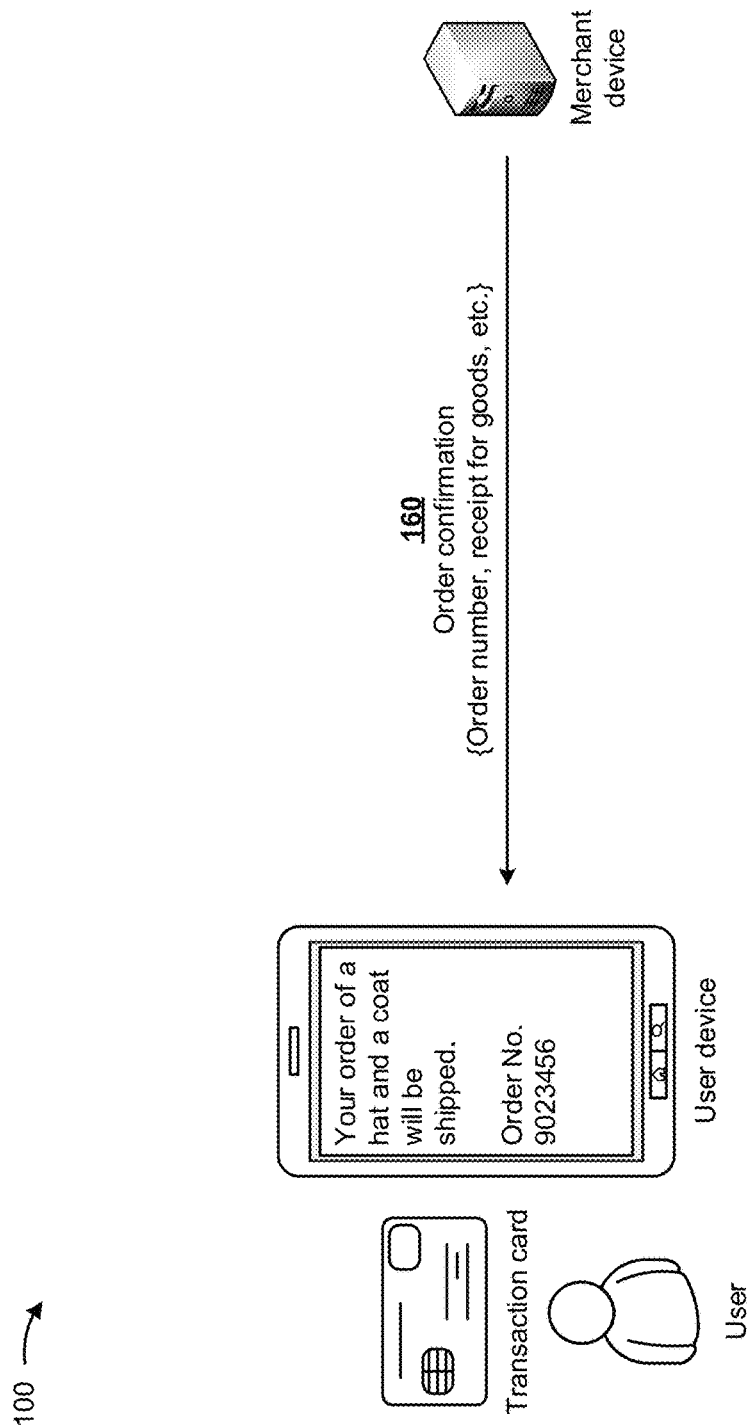

As shown in FIG. 1F, and by reference number 160, the user device may receive, from the merchant device, order confirmation information. In some implementations, the order confirmation information may include information indicating that payment was received for the order, an order identifier (e.g., an order number, an order code, and/or the like), a receipt for the goods and/or services, shipping information, and/or the like. As further shown in FIG. 1F, the user device may provide the order confirmation information for display to the user via a user interface. For example, the user interface may include information indicating that the order (e.g., for the hat and coat) will be shipped, information indicating an order number (e.g., "9023456") for the order, and/or the like.

Figure 1G:
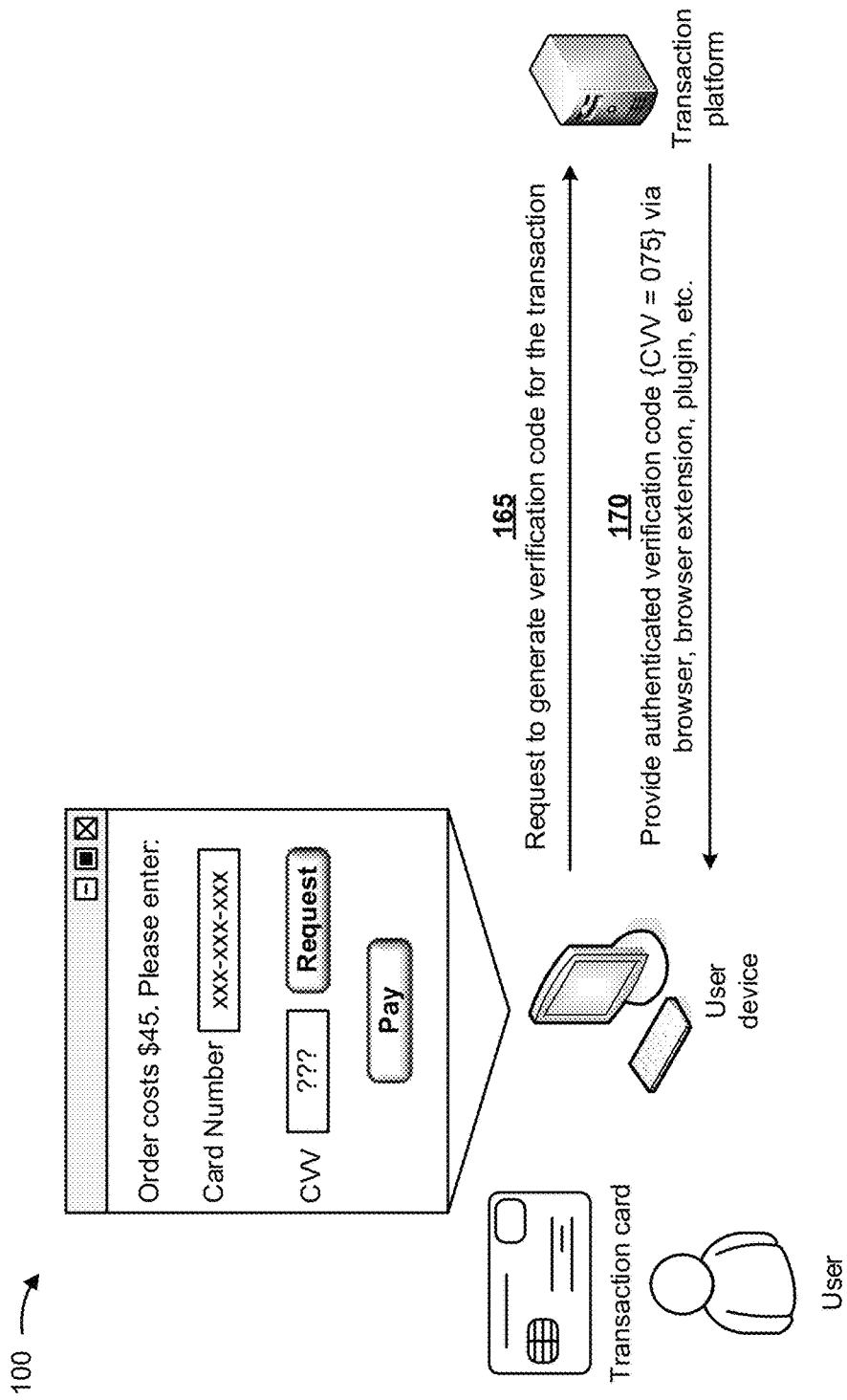

As shown in FIG. 1G, now assume that the user device is a computing device (e.g., a desktop computer, a tablet computer, a laptop computer, and/or the like) with a browser. Further assume that the user utilizes the browser to access the merchant website and receive the transaction page, as described above. In some implementations, the browser may include a mechanism (e.g., a "Request" button, icon, link, etc.) that, when selected by the user, causes the user device to provide, to the transaction platform, a request to generate a verification code for the transaction, as shown by reference number 165 in FIG. 1G. In such implementations, the transaction platform may receive the request, and may generate and authenticate a verification code based on the request, as described elsewhere herein. As further shown in FIG. 1G, and by reference number 170, the transaction platform may provide the authenticated verification code to the user device, and the browser of the user device may automatically populate the transaction form (e.g., a CVV field) with the authenticated verification code. The user may select the "Pay" mechanism associated with the transaction form in order to begin the transaction process, as described elsewhere herein.

In some implementations, the browser may include a browser extension, a browser plugin, and/or the like that automatically requests the verification code from the transaction platform whenever a verification code field (e.g., a CVV field) appears in a transaction form. In such implementations, the browser extension and/or browser plugin may automatically populate the transaction form (e.g., a CVV field) with the authenticated verification code.

Figure 1H:
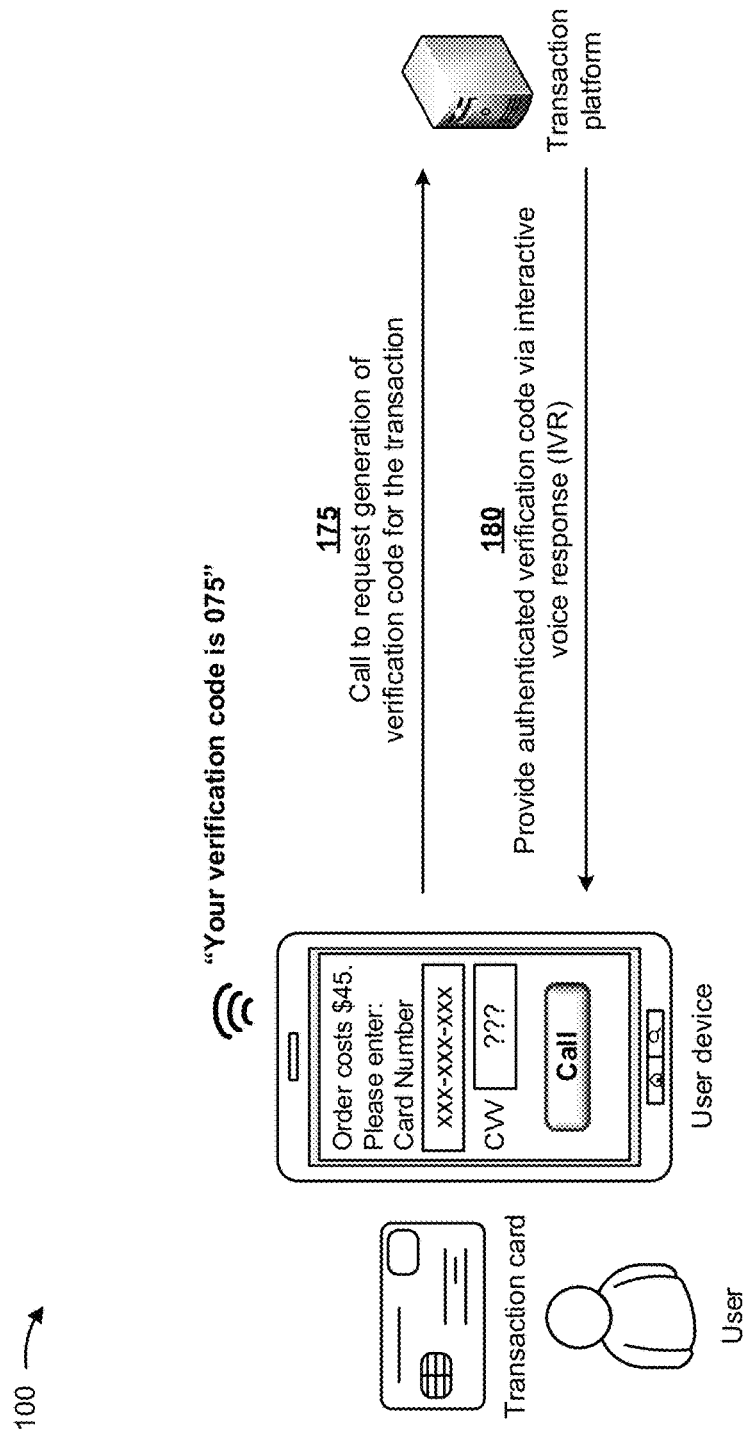

As shown in FIG. 1H, now assume that the user device is a mobile device (e.g., a mobile telephone, a tablet computer, a laptop computer, and/or the like) that is capable of making telephone calls. In such implementations, the user device may include a mechanism (e.g., a "Call" button, icon, link, and/or the like) that, when selected by the user, causes the user device to provide, to the transaction platform, a call requesting the transaction platform to generate a verification code for the transaction, as shown by reference number 175 in FIG. 1H. In such implementations, the transaction platform may receive the call, and may generate and authenticate a verification code based on the call, as described elsewhere herein. As further shown in FIG. 1H, and by reference number 180, the transaction platform may provide the authenticated verification code to the user device via an interactive voice response (IVR) (e.g., audibly indicating "Your verification code is 075"), and the user may populate the transaction form (e.g., a CVV field) with the authenticated verification code received via the IVR. The user may select the "Pay" mechanism associated with the transaction form in order to begin the transaction process, as described elsewhere herein.

Figure 1I:
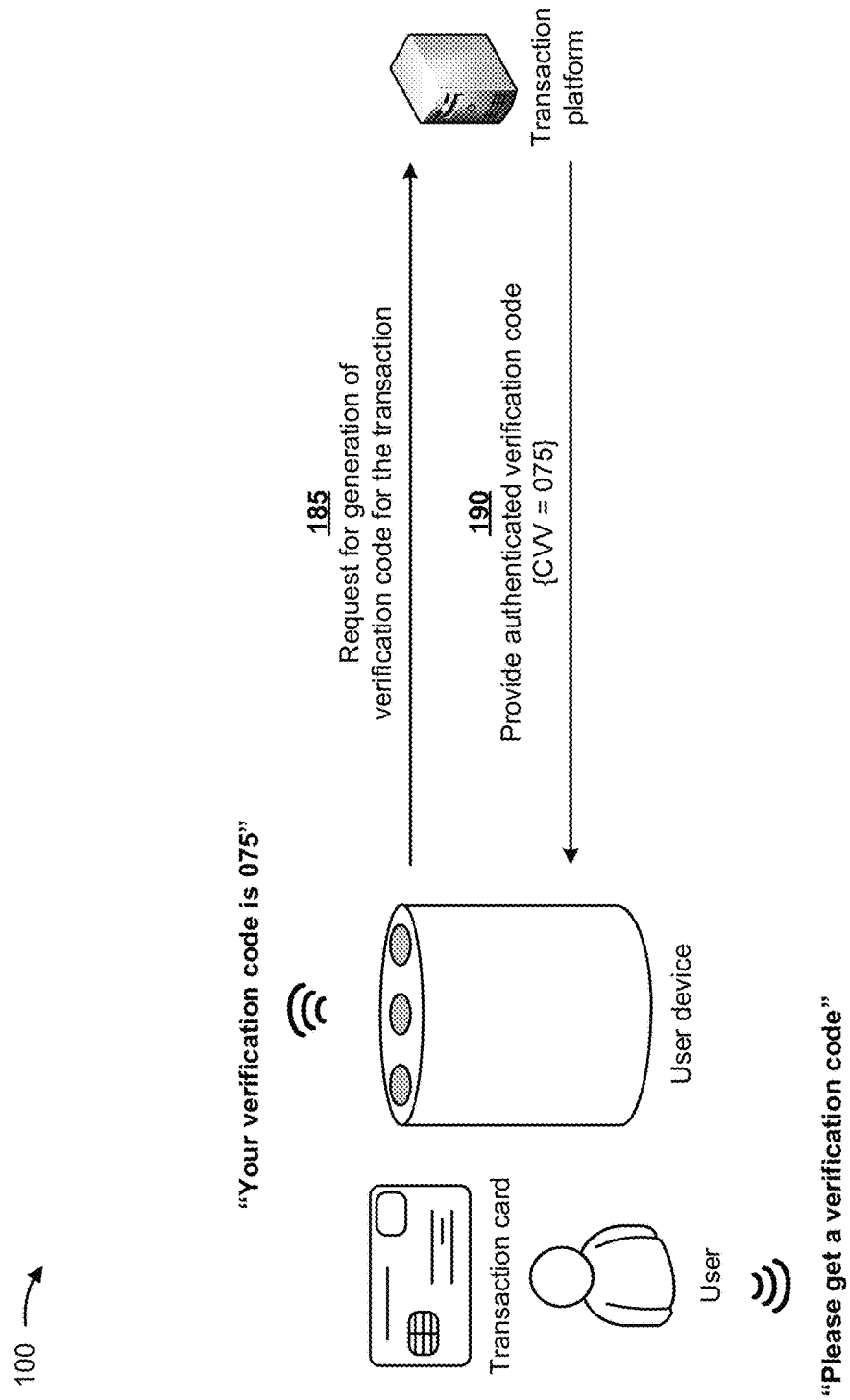

As shown in FIG. 1I, now assume that the user device is a smart device (e.g., Amazon Echo®, Google Home®, and/or the like) that is capable of receiving voice commands, and performing actions associated with voice commands. In such implementations, the user may provide, to the user device, a voice command that requests generation of a verification code for the transaction. Based on the voice command, the user device may provide, to the transaction platform, a request for generation of the verification code for the transaction (e.g., or a call requesting generation of the verification code), as shown by reference number 185 in FIG. 1I. In such implementations, the transaction platform may receive the request or the call, and may generate and authenticate a verification code based on the request or the call, as described elsewhere herein. As further shown in FIG. 1I, and by reference number 190, the transaction platform may provide the authenticated verification code to the user device, and the user device may audibly provide the authenticated verification code to the user (e.g., audible indicating "Your verification code is 075"). The user may populate the transaction form (e.g., a CVV field) with the authenticated verification code audibly received from the user device, and may begin the transaction process, as described elsewhere herein.

In this way, several different stages of the process for generating a random verification code for a transaction are automated, which may remove human subjectivity and waste from the process, and which may improve speed and efficiency of the process and conserve computing resources (e.g., processing resources, memory resources, and/or the like). Furthermore, implementations described herein use a rigorous, computerized process to perform tasks or roles that were not previously performed or were previously performed using subjective human intuition or input. For example, currently there does not exist a technique to generate a random verification code for a transaction. Finally, automating the process for generating a random verification code for a transaction conserves computing resources (e.g., processing resources, memory resources, and/or the like) that would otherwise be wasted in attempting to generate a random verification code for a transaction.

As indicated above, FIGS. 1A-1I are provided merely as examples. Other examples are possible and may differ from what was described with regard to FIGS. 1A-1I.

Figure 2:
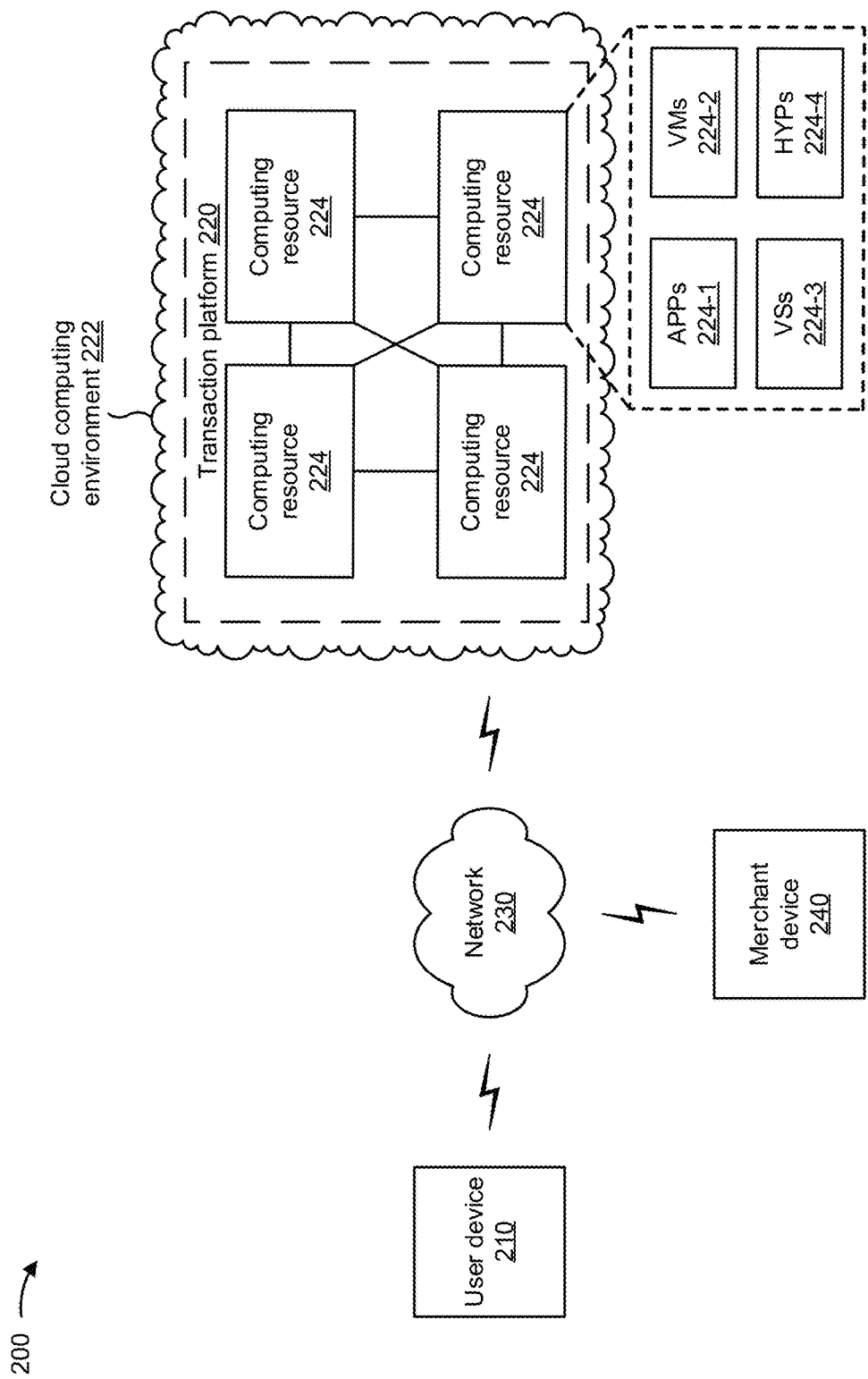
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a transaction platform 220, a network 230, and a merchant device 240. Devices of environment 200 may interconnect via wired connections, wireless connections, or a combination of wired and wireless connections.

User device 210 includes one or more devices capable of receiving, generating, storing, processing, and/or providing information, such as information described herein. For example, user device 210 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device 210 may receive information from and/or transmit information to transaction platform 220 and/or merchant device 240.

Transaction platform 220 includes one or more devices that generate a random verification code for a transaction associated with user device 210 and/or merchant device 240. In some implementations, transaction platform 220 may be designed to be modular such that certain software components may be swapped in or out depending on a particular need. As such, transaction platform 220 may be easily and/or quickly reconfigured for different uses. In some implementations, transaction platform 220 may receive information from and/or transmit information to one or more user devices 210 and/or merchant devices 240.

In some implementations, as shown, transaction platform 220 may be hosted in a cloud computing environment 222. Notably, while implementations described herein describe transaction platform 220 as being hosted in cloud computing environment 222, in some implementations, transaction platform 220 may not be cloud-based (i.e., may be implemented outside of a cloud computing environment) or may be partially cloud-based.

Cloud computing environment 222 includes an environment that hosts transaction platform 220. Cloud computing environment 222 may provide computation, software, data access, storage, etc. services that do not require end-user knowledge of a physical location and configuration of system(s) and/or device(s) that hosts transaction platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host transaction platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by user device 210 and/or merchant device 240. Application 224-1 may eliminate a need to install and execute the software applications on user device 210 and/or merchant device 240. For example, application 224-1 may include software associated with transaction platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., a user of user device 210 and/or merchant device 240, or an operator of transaction platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Merchant device 240 includes a device that conducts and completes a transaction at a time and place of the transaction. For example, merchant device 240 may include a point-of-sale (PoS) device, a mobile phone, a laptop computer, a tablet computer, a desktop computer, a handheld computer, a wearable communication device, or a similar type of device. Merchant device 240 may calculate an amount owed by a customer, may indicate that amount, may prepare an invoice for the customer, and may indicate options for the customer to make payment. Merchant device 240 may be point at which a customer makes a payment to a merchant in exchange for goods or after provision of a service. After receiving payment, merchant device 240 may issue a printed or an electronic receipt for the transaction.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
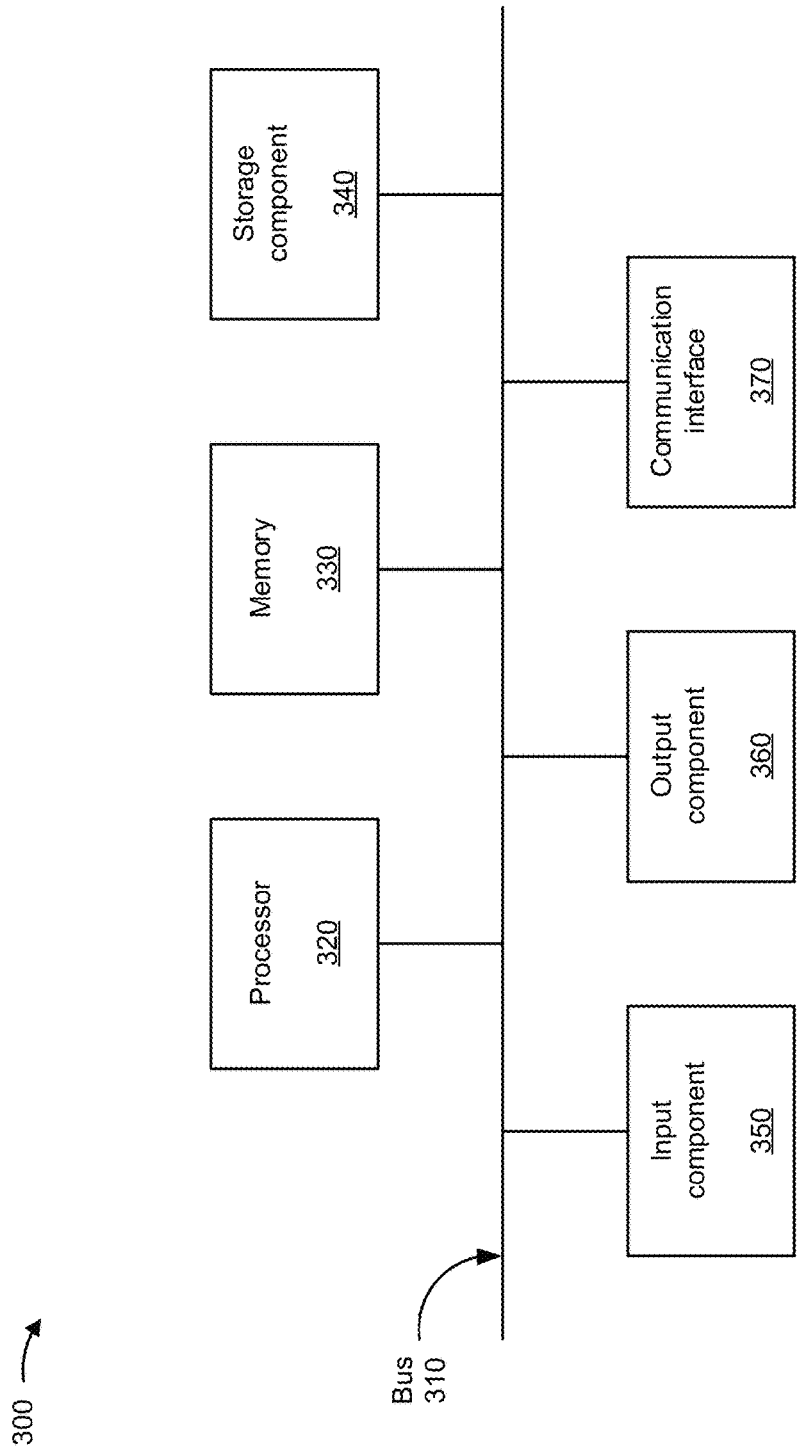
FIG. 3 is a diagram of example components of one or more devices of FIG. 2.

FIG. 3 is a diagram of example components of a device 300. Device 300 may correspond to user device 210, transaction platform 220, computing resource 224, and/or merchant device 240. In some implementations, user device 210, transaction platform 220, computing resource 224, and/or merchant device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for generating a random verification code for a transaction. In some implementations, one or more process blocks of FIG. 4 may be performed by a transaction platform (e.g., transaction platform 220). In some implementations, one or more process blocks of FIG. 4 may be performed by another device or a group of devices separate from or including transaction platform 220, such as user device 210 and/or merchant device 240.

As shown in FIG. 4, process 400 may include receiving, from a user device, a request to generate a verification code for a transaction associated with a user of the user device (block 410). For example, the transaction platform (e.g., using computing resource 224, processor 320, memory 330, communication interface 370, and/or the like) may receive, from a user device, a request to generate a verification code for a transaction associated with a user of the user device, as described above in connection with FIGS. 1A-2.

As further shown in FIG. 4, process 400 may include receiving user profile information associated with a transaction card to be used for the transaction (block 420). For example, the transaction platform (e.g., using computing resource 224, processor 320, communication interface 370, and/or the like) may receive user profile information associated with a transaction card to be used for the transaction, as described above in connection with FIGS. 1A-2.

As further shown in FIG. 4, process 400 may include generating a random verification code for the transaction based on the request and the user profile information (block 430). For example, the transaction platform (e.g., using computing resource 224, processor 320, storage component 340, communication interface 370, and/or the like) may generate a random verification code for the transaction based on the request and the user profile information, as described above in connection with FIGS. 1A-2.

As further shown in FIG. 4, process 400 may include authenticating the random verification code, based on the user profile information, to generate an authenticated random verification code (block 440). For example, the transaction platform (e.g., using computing resource 224, processor 320, communication interface 370, and/or the like) may authenticate the random verification code, based on the user profile information, to generate an authenticated random verification code, as described above in connection with FIGS. 1A-2.

As further shown in FIG. 4, process 400 may include providing the authenticated random verification code to the user device (block 450). For example, the transaction platform (e.g., using computing resource 224, processor 320, memory 330, communication interface 370, and/or the like) may provide the authenticated random verification code to the user device, as described above in connection with FIGS. 1A-2.

As further shown in FIG. 4, process 400 may include receiving transaction information, including the authenticated random verification code, from a merchant device associated with the transaction (block 460). For example, the transaction platform (e.g., using computing resource 224, processor 320, storage component 340, communication interface 370, and/or the like) may receive transaction information, including the authenticated random verification code, from a merchant device associated with the transaction, as described above in connection with FIGS. 1A-2.

As further shown in FIG. 4, process 400 may include validating the transaction based on the transaction information (block 470). For example, the transaction platform (e.g., using computing resource 224, processor 320, communication interface 370, and/or the like) may validate the transaction based on the transaction information, as described above in connection with FIGS. 1A-2.

As further shown in FIG. 4, process 400 may include providing, to the merchant device associated with the transaction, information indicating that the transaction is validated (block 480). For example, the transaction platform (e.g., using computing resource 224, processor 320, communication interface 370, and/or the like) may provide, to the merchant device associated with the transaction, information indicating that the transaction is validated, as described above in connection with FIGS. 1A-2.

Process 400 may include additional implementations, such as any single implementation or any combination of implementations described below and/or described with regard to any other process described herein.

In some implementations, the user profile information may include information identifying the transaction card, information identifying an account associated with the transaction card, information indicating that the verification code is to be used for the transaction, information indicating that the verification code is to be used for a particular time period, and/o information indicating the particular time period. In some implementations, the transaction platform may utilize a random number generator to generate the random verification code, wherein the random number generator may include a pseudorandom number generator, a hardware random number generator, a cryptographically-secure pseudorandom number generator, and/or a random number generator that uses external entropy. In some implementations, the user device may include a mobile device, and the transaction platform may receive the request to generate the verification code from a mobile device application associated with the mobile device, and may provide the authenticated random verification code to the mobile device via the mobile device application or a text message.

In some implementations, the user device may include a computer device, and the transaction platform may receive the request to generate the verification code from a browser application associated with the computer device, and may provide the authenticated random verification code to the computer device via the browser application, a browser extension, a browser plugin, or an email. In some implementations, the user device may include a mobile device, and the transaction platform may receive the request to generate the verification code from a call initiated by the mobile device, and may provide the authenticated random verification code to the mobile device via an interactive voice response to the call. In some implementations, the user device may include a smart device, and the transaction platform may receive the request to generate the verification code from the smart device based on a voice command provided to the smart device, and may provide the authenticated random verification code to the smart device via a voice response. In some implementations, the verification code may include a card verification value.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Some implementations described herein provide a transaction platform that generates a random verification code for a transaction. For example, the transaction platform may receive, from a user device, a request to generate a verification code for a transaction associated with a user of the user device, and may receive user profile information associated with a transaction card to be used for the transaction. The transaction platform may generate a random verification code for the transaction based on the request and the user profile information, and may authenticate the random verification code, based on the user profile information, to generate an authenticated random verification code. The transaction platform may provide the authenticated random verification code to the user device, and may receive transaction information, including the authenticated random verification code, from a merchant device associated with the transaction. The transaction platform may validate the transaction based on the transaction information, and may provide, to the merchant device, information indicating that the transaction is validated.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors configured to:
receive, from an application associated with a user device, a request to generate a verification code for a transaction associated with a user of the user device,
wherein the verification code is a card verification value (CVV), and
wherein the request is received based on a user selection of a command that causes the user device to request generation of the verification code;
receive user profile information associated with a transaction card to be used for the transaction;
generate, based on the request and using a random number generator, a random verification code for the transaction based on the request and the user profile information;
authenticate the random verification code, based on the user profile information, to generate an authenticated random verification code;
update a dynamically updatable record associated with an account of the user to associate the authenticated random verification code with the account;
provide the authenticated random verification code to the user device, wherein providing the authenticated random verification code to the user device comprises:
providing the authenticated random verification code to the user device via the application to cause the application to populate, with the authenticated random verification code, a transaction form associated with the transaction;
receive transaction information, including the authenticated random verification code, from a merchant device associated with the transaction;
validate the transaction based on the authenticated random verification code and the updated record; and
provide, to the merchant device associated with the transaction, information indicating that the transaction is validated.

2. The device of claim 1, wherein the user profile information includes one or more of:
information identifying the transaction card,
information identifying the account,
information indicating that the verification code is to be used for the transaction,
information indicating that the verification code is to be used for a particular time period, or
information indicating the particular time period.

3. The device of claim 1, wherein
the random number generator includes one or more of:
a pseudorandom number generator,
a hardware random number generator,
a cryptographically-secure pseudorandom number generator, or
a random number generator that uses external entropy.

4. The device of claim 1, wherein:
the user device is a mobile device, and
the application is a mobile device application associated with the mobile device; and
wherein the one or more processors, when providing the authenticated random verification code to the user device, are configured to:
provide the authenticated random verification code to the mobile device via the mobile device application or a text message.

5. The device of claim 1, wherein:
the user device is a computer device, and
the application is a browser application associated with the computer device; and
wherein the one or more processors, when providing the authenticated random verification code to the user device, are configured to:
provide the authenticated random verification code to the computer device via the browser application, a browser extension, a browser plugin, or an email.

6. The device of claim 1, wherein the user device is a mobile device,
wherein the one or more processors, when receiving, are configured to:
receive the request from a call initiated by the mobile device; and
wherein the one or more processors, when providing the authenticated random verification code to the user device, are configured to:

provide the authenticated random verification code to the mobile device via an interactive voice response to the call.

7. The device of claim 1, wherein:
the user device is a smart device,
wherein the one or more processors, when receiving the request, are configured to:
receive the request from the smart device based on a voice command provided to the smart device; and
wherein the one or more processors, when providing the authenticated random verification code to the user device, are configured to:
provide the authenticated random verification code to the smart device via a voice response.

8. A non-transitory computer-readable medium storing instructions, the instructions comprising:
one or more instructions that, when executed by one or more processors of a device, cause the one or more processors to:
receive user profile information associated with generating a verification code for a transaction card to be used for a transaction,
the transaction and the transaction card being associated with a user of a user device,
the user profile information including one or more of:
information identifying the transaction card,
information identifying an account associated with the transaction card,
information indicating that the verification code is to be used for the transaction,
information indicating that the verification code is to be used for a particular time period, or
information indicating the particular time period;
receive, from an application associated with the user device, a request to generate the verification code for the transaction,
wherein the verification code is a card verification value (CVV), and
wherein the request is received based on a user selection of a command that causes the user device to request generation of the verification code;
generate, based on the request and using a random number generator, a random verification code for the transaction based on the request and the user profile information;
authenticate the random verification code, based on the user profile information, to generate an authenticated random verification code;
update a dynamically updatable record associated with the account to associate the authenticated random verification code with the account;
provide the authenticated random verification code to the user device, wherein providing the authenticated random verification code to the user device comprises:
providing the authenticated random verification code to the user device via the application to cause the application to populate, with the authenticated random verification code, a transaction form associated with the transaction;
receive transaction information, including the authenticated random verification code, from a merchant device associated with the transaction;
validate the transaction based on the authenticated random verification code and the updated record;

provide, to the merchant device associated with the transaction, information indicating that the transaction is validated; and
provide, to the user device, information confirming that the transaction is complete.

9. The non-transitory computer-readable medium of claim 8, wherein
the random number generator includes one or more of:
a pseudorandom number generator,
a hardware random number generator,
a cryptographically-secure pseudorandom number generator, or
a random number generator that uses external entropy.

10. The non-transitory computer-readable medium of claim 8, wherein the user device is a mobile device, and
wherein the one or more instructions, that cause the one or more processors to provide the authenticated random verification code to the user device, cause the one or more processors to:
provide the authenticated random verification code to the mobile device via a mobile device application or a text message application associated with the mobile device.

11. The non-transitory computer-readable medium of claim 8, wherein the user device is a computer device, and
wherein the one or more instructions, that cause the one or more processors to provide the authenticated random verification code to the user device, cause the one or more processors to:
provide the authenticated random verification code to the computer device via a browser application, a browser extension, a browser plugin, or an email associated with the computer device.

12. The non-transitory computer-readable medium of claim 8, wherein the user device is a mobile device, and
wherein the one or more instructions, that cause the one or more processors to provide the authenticated random verification code to the user device, cause the one or more processors to:
provide the authenticated random verification code to the mobile device via an interactive voice response to a call with the mobile device.

13. The non-transitory computer-readable medium of claim 8, wherein the user device is a smart device, and
wherein the one or more instructions, that cause the one or more processors to provide the authenticated random verification code to the user device, cause the one or more processors to:
provide the authenticated random verification code to the smart device via a voice response to a voice command provided to the smart device.

14. A method comprising:
receiving, by a transaction device and from an application associated with a user device, a request to generate a verification code for a transaction associated with a user of the user device,
wherein the verification code is a card verification value (CVV), and
wherein the request is received based on a user selection of a command that causes the user device to request generation of the verification code;
receiving, by the transaction device, user profile information associated with a transaction card to be used for the transaction;
generating, by the transaction device, based on the request, and using a random number generator, a random verification code for the transaction based on the request and the user profile information;

authenticating, by the transaction device and based on the user profile information, the random verification code, to generate an authenticated random verification code;

updating, by the transaction device, a dynamically updatable record associated with an account of the user to associate the authenticated random verification code with the account;

providing, by the transaction device, the authenticated random verification code to the user device,
wherein providing the authenticated random verification code to the user device comprises:
providing the authenticated random verification code to the user device via the application to cause the application to populate, with the authenticated random verification code, a transaction form associated with the transaction;

receiving, by the transaction device, transaction information, including the authenticated random verification code, from a merchant device associated with the transaction;

validating, by the transaction device, the transaction based on the authenticated random verification code and the updated record; and providing, by the transaction device and to the merchant device associated with the transaction, information indicating that the transaction is validated.

15. The method of claim 14, wherein the user profile information includes information indicating that the random verification code is valid for the transaction for a particular time period, and
wherein validating the transaction further comprises:
validating the transaction based on the particular time period having not yet elapsed.

16. The method of claim 14, wherein the user device is a mobile device, and
wherein receiving the request to generate the verification code comprises:
receiving the request from a mobile device application associated with the mobile device.

17. The method of claim 14, wherein the user device is a computer device, and
wherein receiving the request to generate the verification code comprises:
receiving the request from a browser application associated with the computer device.

18. The method of claim 14, wherein the user device is a mobile device, and
wherein receiving the request to generate the verification code comprises:
receiving the request from a call initiated by the mobile device.

19. The method of claim 14, wherein the user device is a smart device, and
wherein receiving the request to generate the verification code comprises:
receiving the request from the smart device based on a voice command provided to the smart device.

20. The method of claim 14, wherein the user profile information includes one or more of:
information identifying the transaction card,
information identifying the account,
information indicating that the verification code is to be used for the transaction,
information indicating that the verification code is to be used for a particular time period, or
information indicating the particular time period.

* * * * *